US008042965B2

United States Patent
Peng et al.

(10) Patent No.: US 8,042,965 B2
(45) Date of Patent: Oct. 25, 2011

(54) LENS AND BACKLIGHT MODULE OF DISPLAY UTILIZING THE SAME

(75) Inventors: Ci-Guang Peng, Hsinchu (TW); Shen-Hong Chou, Hsinchu (TW)

(73) Assignee: Au Optronics Corp., Hsinchu (TW)

( * ) Notice: Subject to any disclaimer, the term of this patent is extended or adjusted under 35 U.S.C. 154(b) by 231 days.

(21) Appl. No.: 11/845,842

(22) Filed: Aug. 28, 2007

(65) Prior Publication Data
US 2008/0106902 A1    May 8, 2008

(30) Foreign Application Priority Data
Nov. 6, 2006    (TW) ................................ 95140968 A

(51) Int. Cl.
*G09F 13/04*    (2006.01)
*G09F 13/08*    (2006.01)

(52) U.S. Cl. ............. 362/97.3; 362/249.02; 362/311.02; 362/608; 362/800

(58) Field of Classification Search ................. 362/240, 362/299–301, 307–309, 311, 326–327, 332–335, 362/628, 800, 97.1–97.3, 249.02, 311.02, 362/608
See application file for complete search history.

(56) References Cited

U.S. PATENT DOCUMENTS
| | | | |
|---|---|---|---|
| 6,874,900 B2 * | 4/2005 | Hsieh | 362/26 |
| 2005/0001537 A1 * | 1/2005 | West et al. | 313/500 |
| 2006/0067079 A1 * | 3/2006 | Noh et al. | 362/327 |

* cited by examiner

*Primary Examiner* — Jason Moon Han
(74) *Attorney, Agent, or Firm* — Thomas|Kayden

(57) ABSTRACT

A display includes a panel and a backlight module. The backlight module includes a reflective board, a shell, at least two lenses and a light source. The lenses are installed on the reflective board. The reflective board is installed on the shell. The light source is installed in the shell and the light from the light source passes through the lenses. Each lens includes a bottom portion on the reflective board and an extending portion protruding slantwise from the bottom portion. The extending portion includes a reflective surface opposite to the reflective board approximately. A light from the light source is reflected onto the reflective board via the reflective surface, and then reflected onto the panel via the reflective board.

15 Claims, 5 Drawing Sheets

LENS AND BACKLIGHT MODULE OF DISPLAY UTILIZING THE SAME

BACKGROUND OF THE INVENTION

1. Field of the Invention

The invention relates to a lens and a backlight module of a display utilizing the same.

2. Description of the Related Art

A conventional lens 10 is shown in FIG. 1. A light source 20 emits light to enter the lens 10. The lens 10 comprises an incident surface 11, a refracting surface 12, a reflective surface 13 and an exiting surface 14. The light emitted from the light source 20 enters the lens 10 via the incident surface 11. After the light enters the lens 10, the light is divided into two optical paths A and B. The optical path A shows light transmitted to the refracting surface 12 from the incident surface 11, passes through the refracting surface 12 to leave the lens 10. The optical path B shows light transmitted to the reflective surface 13 from the incident surface 11, passes through the exiting surface 14 to leave the lens 10. Referring to FIG. 1, regardless of whether the light is transmitted in the optical path A or the optical path B, the light finally leaves the lens 10 horizontally. When the conventional lens 10 is applied to the backlight module, the light passes through the lens 10 and proceeds toward two sides of the backlight module. The conventional lens 10 increases the distance of adjacent lenses 10, however, the conventional lens 10 do not control light distribution. Thus, the thickness of the backlight module must be increased (about 50 mm) for averaging the lights.

SUMMARY OF INVENTION

The present invention provides a lens and a backlight module of display utilizing the same. The lens is installed on a reflective board. A light is emitted by a light source. The lens comprises a bottom portion on the reflective board and an extending portion. The extending portion comprises a reflective surface. The reflective surface is located opposite to the reflective board. The light strikes the reflective surface and is reflected onto the reflective board.

The lens further comprises a refracting portion, wherein the light passes through the refracting portion to strike the reflective surface.

A backlight module comprises a reflective board, a shell, at least two lenses and a light source. The reflective board is installed in the shell. The light source is installed under the lens. The reflective surface is located opposite to the reflective board. The structure of the lenses are left-right reversed. A light emitted from the light source strikes the reflective surface and is reflected onto the reflective board.

A display comprises a panel and the backlight module. The reflective surface is located opposite to the reflective board. A light emitted from the light source strikes the reflective surface, is reflected onto the reflective board and is then reflected onto the panel.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by the appended claims.

Figure 1:
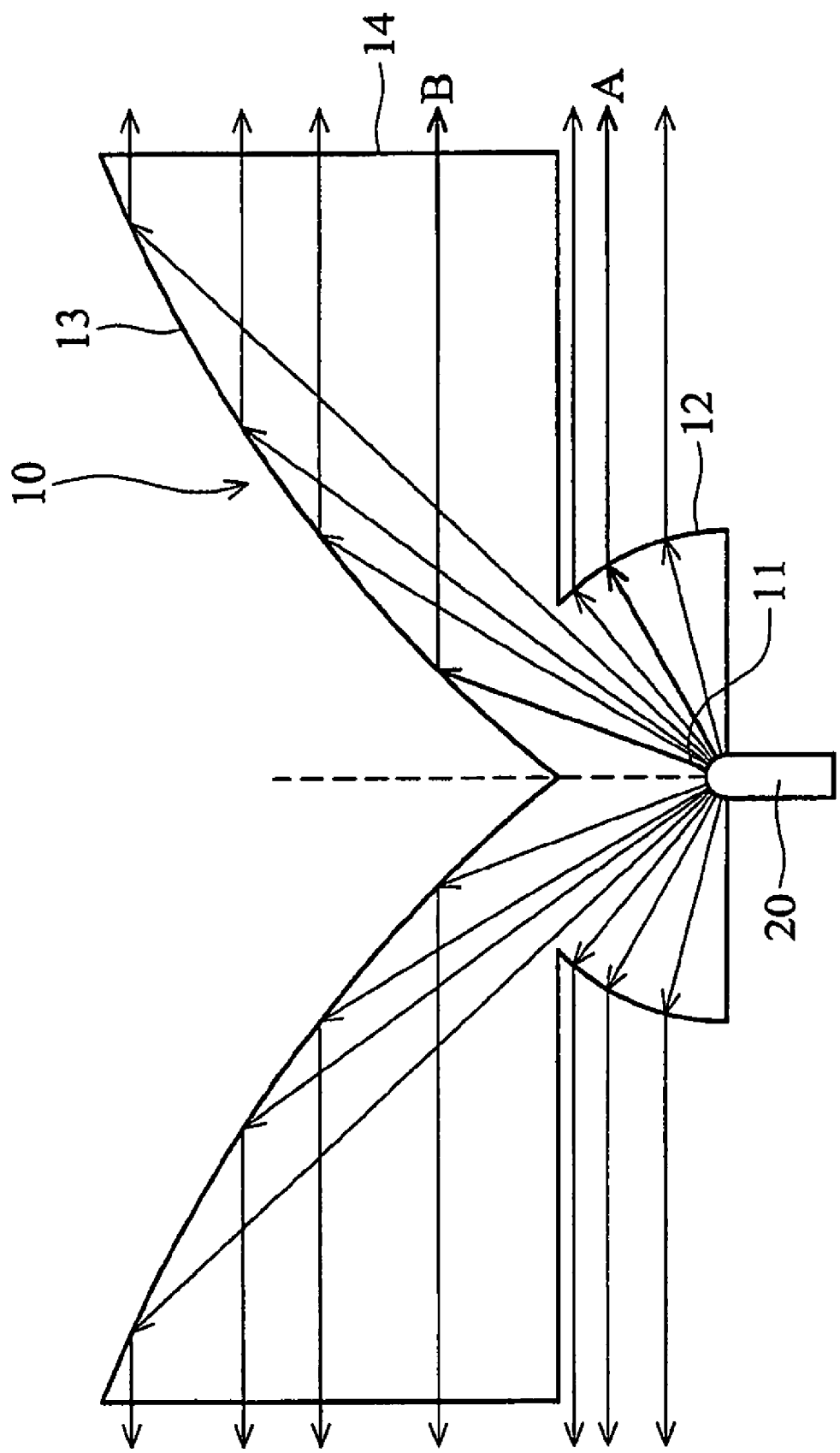
FIG. 1 is a schematic view showing a conventional lens.
Figure 2:
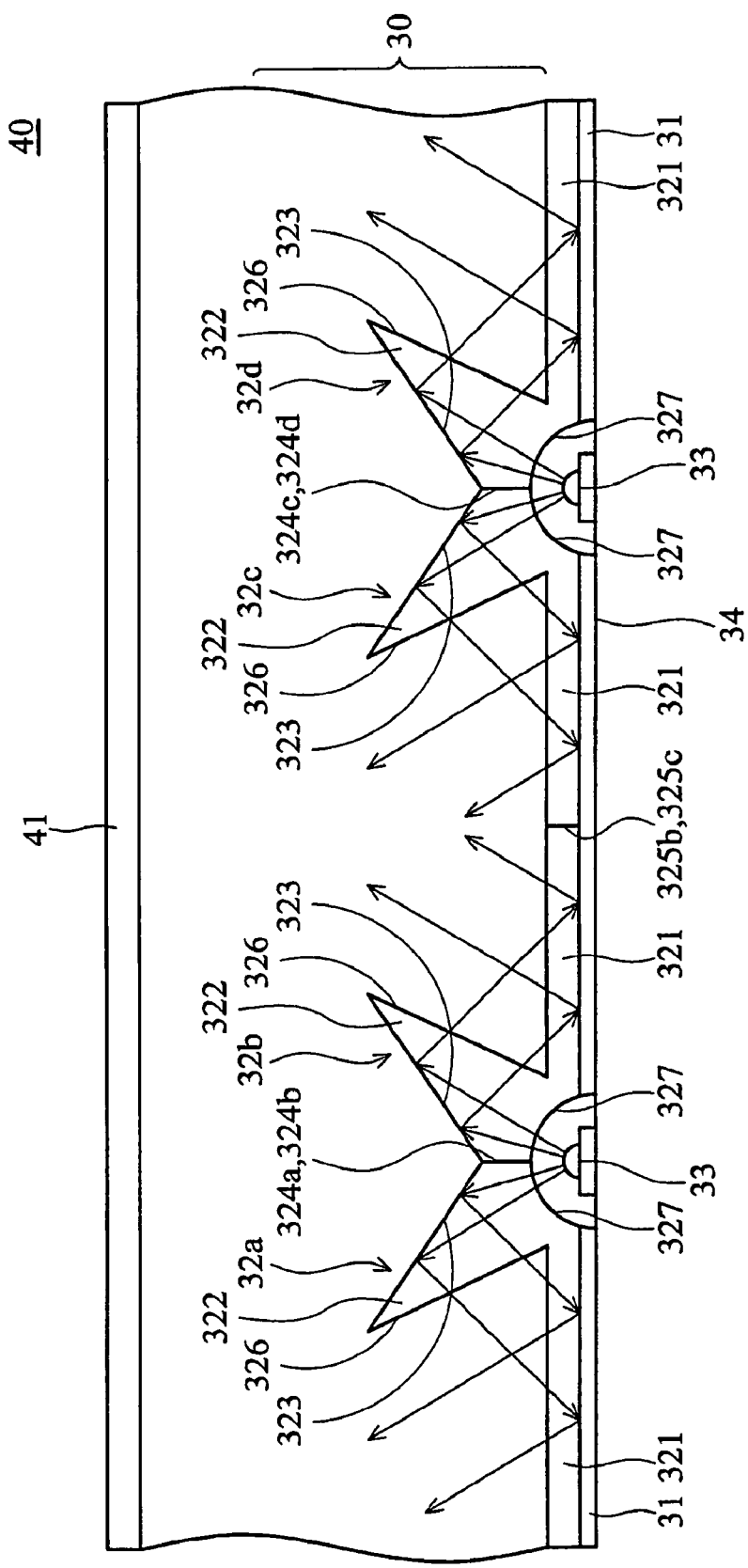
FIG. 2 is a schematic view showing an embodiment of a backlight module of the invention.

Referring to FIG. 2, a display 40 comprises a panel 41 and a backlight module 30. The backlight module 30 comprises a reflective board 31, a plurality of lenses 32a, 32b, 32c, and 32d, a shell 34 and a light source 33. The reflective board 31 is installed in the shell 34. Each lens 32a, 32b, 32c, and 32d comprises a bottom portion 321 and an extending portion 322. The bottom portion 321 is parallel to and installed on the reflective board 31. The extending portion 322 comprises reflective surface 323 located opposite to the reflective board 31. The panel 41 is located opposite to the reflective board 31. The backlight module 30 is installed between the panel 41 and the reflective board 31. In this embodiment, the lens 32a connects to the lens 32b, and the lens 32c connects to the lens 32d. Note that the structure of the lenses 32a and 32c and the structure of the lenses 32b and 32d are left-right reversed. The lenses 32a, 32b, 32c, and 32d respectively comprise first surfaces 324a, 324b, 324c and 324d. The first surface 324a connects to the first surface 324b, and the first surface 324c connects to the first surface 324d. The lenses 32b and 32c further comprise connecting surfaces 325b and 325c. The lens 32b connects to the lens 32c via connection of the connecting surfaces 325b and 325c.

The lenses 32a, 32b, 32c, and 32d further respectively comprise a second surface 326 and an incident surface 327. The light emitted from the light source 33 enters the lenses 32a, 32b, 32c, and 32d via the incident surface 327 and reaches the reflective surface 323. The light is then reflected to strike the bottom portion 321 via the reflective surface 323, and then passes through the bottom portion 321 to strike the reflective board 31. Finally, the light is reflected to the panel 41 of the display 40 via the reflective board 31.

Figure 3:
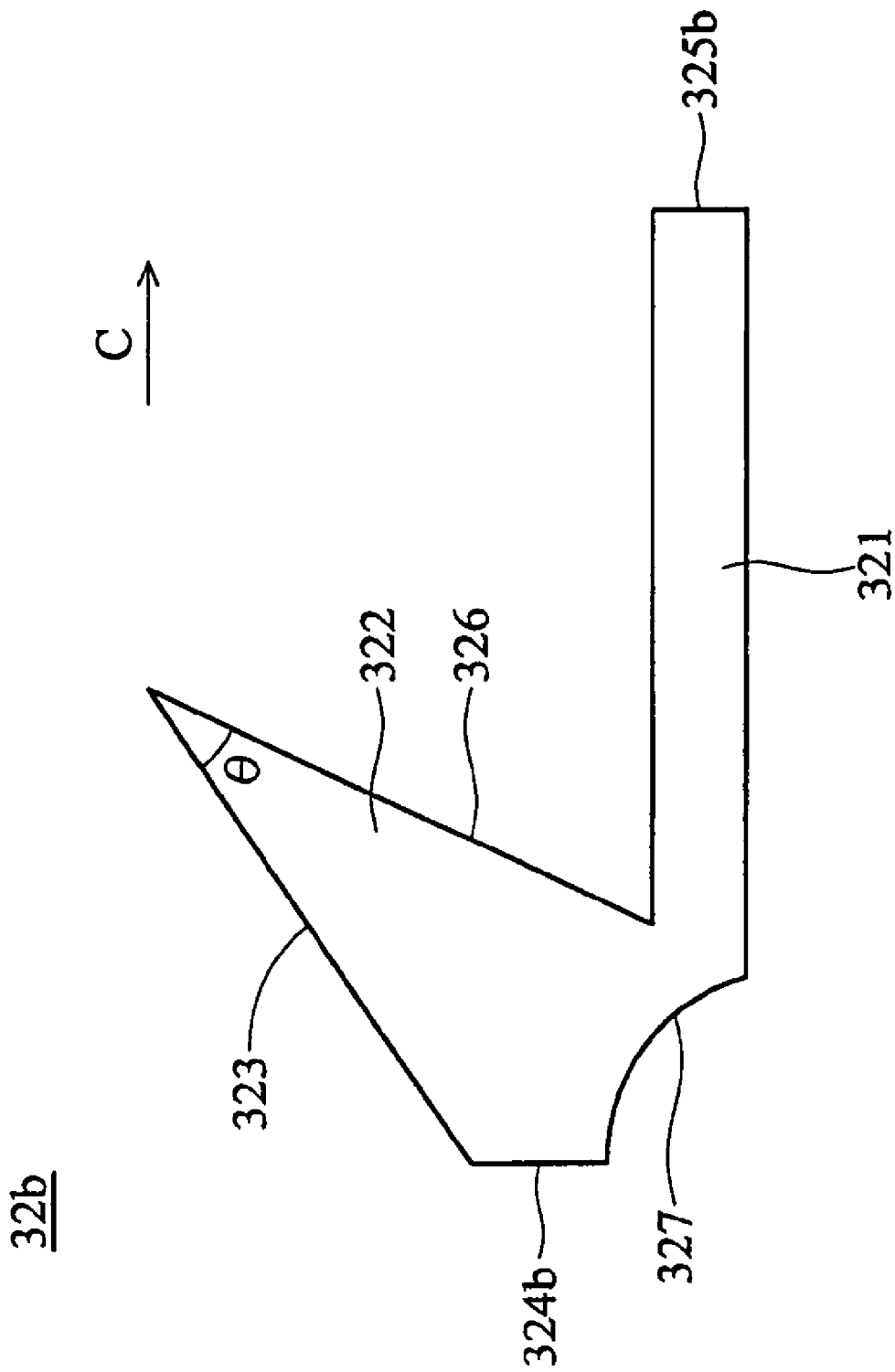
FIG. 3 is a schematic view showing a lens in FIG. 2.

FIG. 3 shows the structure of the lens 32b. The bottom portion 321 and the extending portion 322 extend in the same direction (as indicated by arrow C of FIG. 3). The second surface 326 is located between the reflective surface 323 and the bottom portion 321. The incident surface 327 is located between the bottom portion 321 and the first surface 324b. The first surface 324b further connects to the reflective surface 323. Note that the second surface 326 and the reflective surface 323 form an included angle θ. The incident surface 327 is concave. When the lens 32b is assembled in the backlight module 30, the light source 33 is installed under the lens 32b and fixed in the shell 34 (shown in FIG. 2). The first surface 324b is substantially perpendicular to the bottom portion 321.

Figure 4:
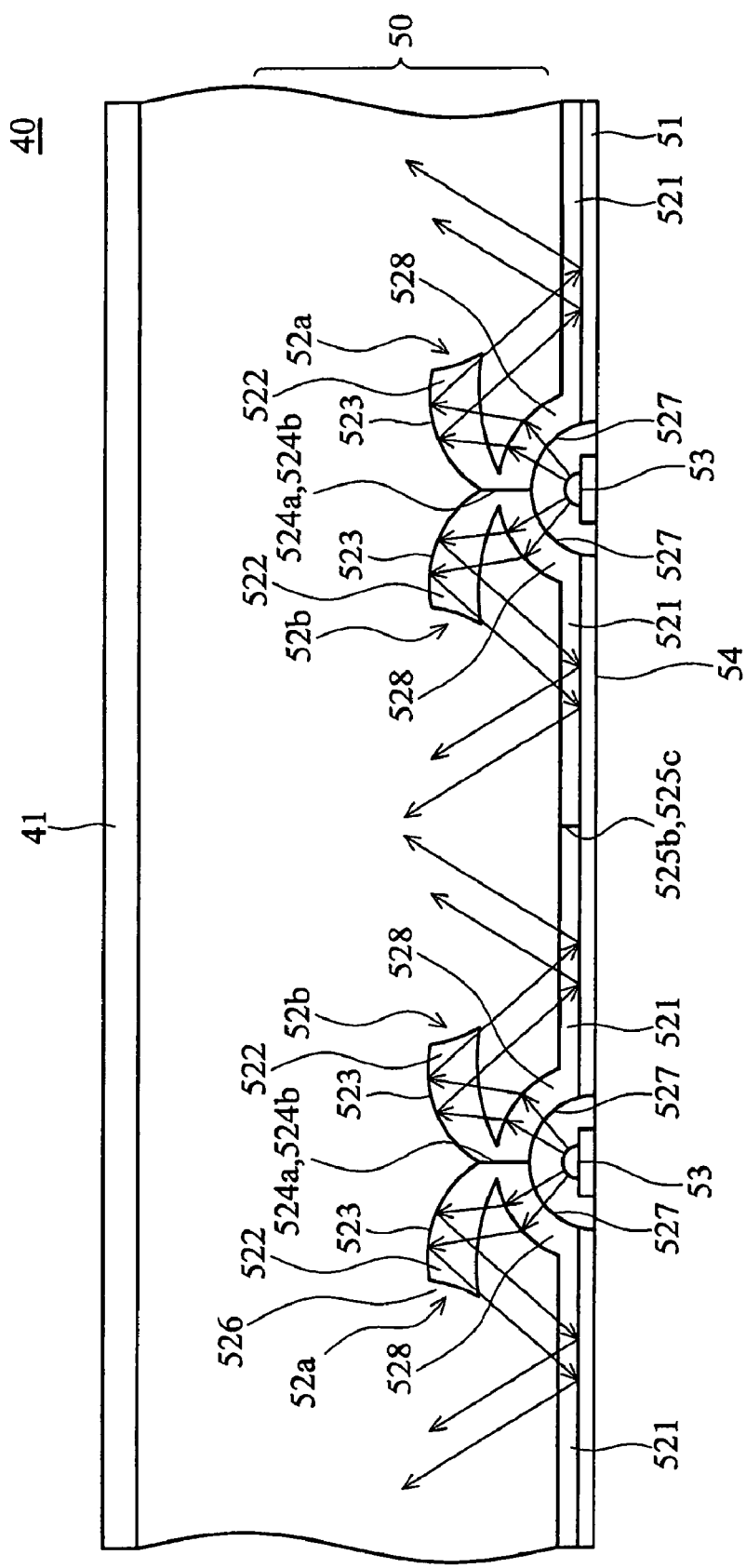
FIG. 4 is a schematic view showing another embodiment of a backlight module of the invention.

FIG. 4 is a schematic view showing another embodiment of a backlight module 50. Referring to FIG. 4, a display 40 comprises a panel 41 and a backlight module 50. The backlight module 50 comprises a reflective board 51, a plurality of lenses 52a, 52b, 52c, and 52d, a shell 54 and a light source 53. Each lens 52a, 52b, 52c, and 52d comprises a bottom portion 521, an extending portion 522 and a refracting portion 528. The bottom portion 521 is parallel to and installed on the reflective board 51. The extending portion 522 comprises reflective surface 523 located opposite to the reflective board 51. The refracting portion 528 is located between the bottom portion 521 and the extending portion 522. In this embodiment, the refracting portion 528 is curved. The panel 41 is located opposite to the reflective board 51. The backlight module 50 is installed between the panel 41 and the reflective board 51. In this embodiment, the lens 52a connects to the lens 52b, and the lens 52c connects to the lens 52d. Note that the structure of the lenses 52a and 52c and the structure of the lenses 52b and 52d are left-right reversed. The lenses 52a, 52b, 52c, and 52d respectively comprise first surfaces 524a, 524b, 524c and 524d. The first surface 524a connects to the first surface 524b, and the first surface 524c connects to the first surface 524d. The lenses 52b and 52c further comprise connecting surfaces 525b and 525c. The lens 52b connects to the lens 52c via connection of the connecting surfaces 525b and 525c.

The lenses 52a, 52b, 52c, and 52d further respectively comprise a second surface 526 and an incident surface 527. The light emitted from the light source 53 enters the lenses 52a, 52b, 52c, and 52d via the incident surface 527 and reaches the reflective surface 523. The light then passes through the refracting portion 528 and strikes the reflective surface 523. The light is reflected to the bottom portion 521 via the reflective surface 523, and then passes through the bottom portion 521 to strike the reflective board 51. Finally, the light is reflected to the panel 41 of the display 40 via the reflective board 51.

Figure 5:
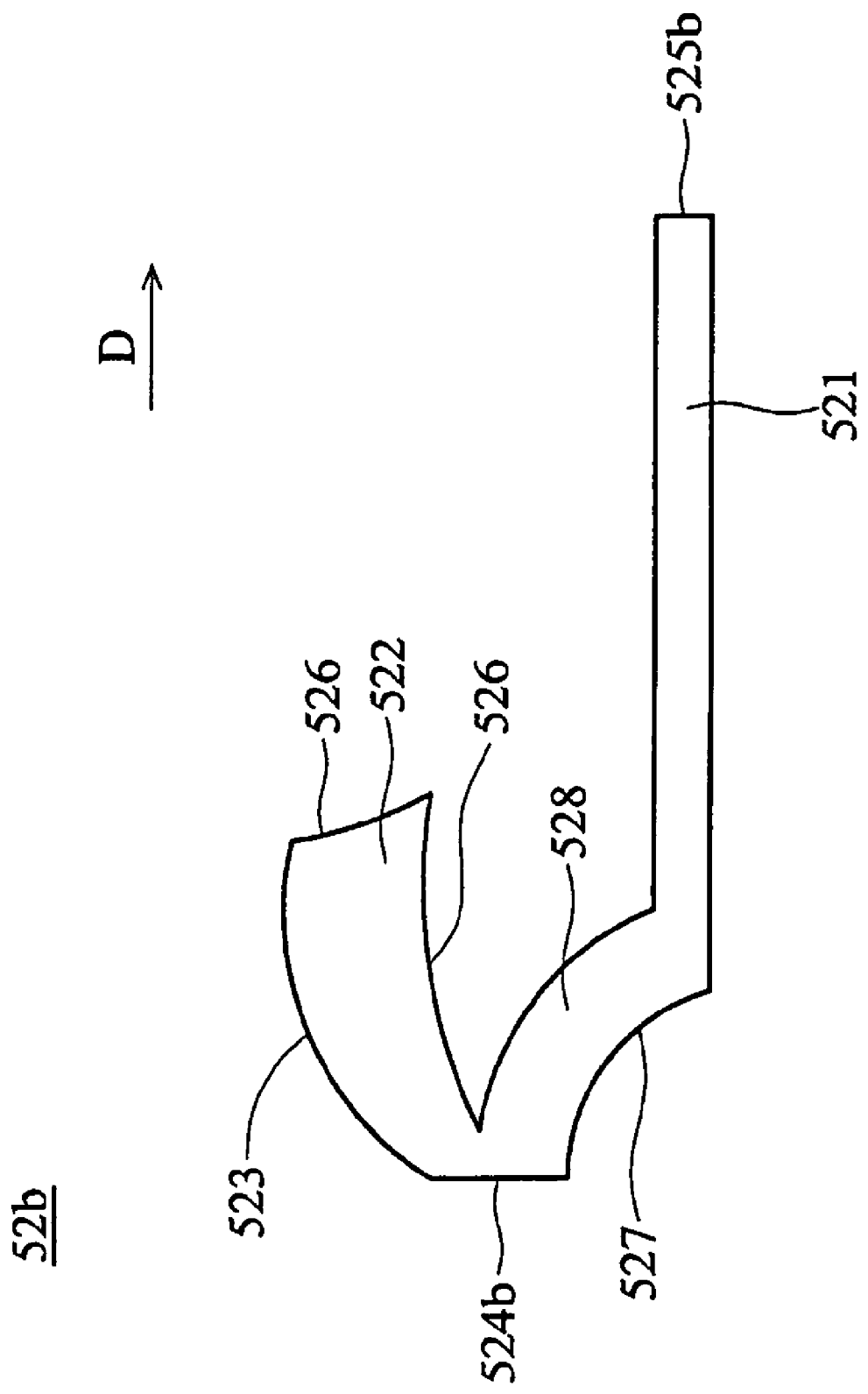
FIG. 5 is a schematic view showing a lens in FIG. 4.

FIG. 5 shows the structure of the lens 52b. The bottom portion 521 and the extending portion 522 extend in the same direction (shown as arrow D of FIG. 5). The second surface 526 is located between the reflective surface 523 and the refracting portion 528. The refracting portion 528 is adjacent to the bottom portion 521. The incident surface 527 is located between the bottom portion 521 and the first surface 524b. The first surface 524b further connects to the reflective surface 523. Note that the incident surface 527 is concave. When the lens 52b is assembled in the backlight module 50, the light source 53 is installed under the lens 52b and fixed in the shell 54 (shown in FIG. 4). The first surface 524b is substantially perpendicular to the bottom portion 521.

The lenses 32a, 32b, 32c, 32d, 52a, 52b, 52c, and 52d and the backlight modules 30 and 50 of the display utilizing the lens can increase the distance of adjacent lenses. Moreover, the lenses 32a, 32b, 32c, 32d, 52a, 52b, 52c, and 52d and the backlight modules 30 and 50 can prevent increased backlight module thickness for averaging the lights. After the light strikes the reflective surfaces 323 and 523 and the reflective boards 31 and 51, the light is directly reflected to the panel 41. Thus, the backlight modules 30 and 50 utilizing the lenses 32a, 32b, 32c, 32d, 52a, 52b, 52c, and 52d not only increase the distance of adjacent lenses but also directly guides the light to the panel 41.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A direct backlight module, comprising:
   a shell;
   a reflective board installed in the shell;
   at least two lenses contacting and abutting each other side by side, each lens comprising:
      a planar bottom portion contacting and covering the reflective board, wherein the bottom portions of the lenses contact each other; and
      an extending portion having a projection area on the reflective board and comprising a reflective surface; and
   a light source disposed under the lenses in the shell;
   wherein the reflective surface is located opposite to the reflective board, the bottom portion extends beyond the projection area of the extending portion along a direction parallel to the reflective board, and the structure of the lenses is left-right reversed.

2. The backlight module as claimed in claim 1, wherein the bottom portion and the extending portion extend in the same direction.

3. The backlight module as claimed in claim 1, wherein each lens further comprises a first surface, a second surface, and an incident surface, wherein:
   the second surface connects to the reflective surface and the bottom portion;
   the reflective surface connects to the first surface and the second surface;
   the bottom portion connects to the second surface and the incident surface; and
   the second surface and the reflective surface form an included angle.

4. The backlight module as claimed in claim 3, wherein the first surface is substantially perpendicular to the bottom portion.

5. The backlight module as claimed in claim 1, wherein each lens further comprises a refracting portion, wherein the light passes through the refracting portion to strike the reflective surface.

6. The backlight module as claimed in claim 5, wherein the refracting portion is located between the bottom portion and the extending portion.

7. The backlight module as claimed in claim 6, wherein the refracting portion is curved.

8. The backlight module as claimed in claim 5, wherein the extending portion further comprises a second surface and a first surface, the second surface and the first surface connect to the refracting portion.

9. The backlight module as claimed in claim 1, wherein the bottom portion is parallel to the reflective board.

10. A display, comprising:
    a direct backlight module, comprising:
       a shell;
       a reflective board, installed in the shell;
       at least two lenses contacting and abutting each other side by side, each lens comprising:
          a planar bottom portion, contacting and covering the reflective board, wherein the bottom portions of the lenses contact each other; and
          an extending portion having a projection area on the reflective board and comprising a reflective surface;
    a light source disposed under the lenses in the shell; and
    a panel, located opposite to the reflective board;
    wherein:
    the lenses of the backlight module are installed between the panel and the reflective board;

the reflective surface is located opposite to the reflective board;

the bottom portion extends beyond the projection area of the extending portion along a direction parallel to the reflective board;

the structure of the lenses are left-right reversed; and a light emitted from the light source strikes the reflective surface, and is reflected onto the reflective board and the panel.

11. The display as claimed in claim 10, wherein the bottom portion and the extending portion extend in the same direction.

12. The display as claimed in claim 10, wherein each lens further comprises a first surface, a second surface, and an incident surface, wherein:

the second surface connects to the reflective surface and the bottom portion;

the reflective surface connects to the first surface and the second surface;

the bottom portion connects to the second surface and the incident surface; and the second surface and the reflective surface form an included angle.

13. The display as claimed in claim 12, wherein each lens further comprises a refracting portion, wherein: the light passes through the refracting portion to strike the reflective surface; the refracting portion is located between the bottom portion and the extending portion; and the refracting portion is curved.

14. The display as claimed in claim 13, wherein the extending portion further comprises a first surface and a second surface, and the first surface and the second surface connect to the refracting portion.

15. The display as claimed in claim 10, wherein the bottom portion is parallel to the reflective board.

* * * * *